March 31, 1964 A. A. MUELLER 3,127,501
PRECISION ELECTRIC WELDING HEAD
Filed April 27, 1962 4 Sheets-Sheet 1

INVENTOR.
ANDREW A. MUELLER
BY Eugene C. Knoblock
ATTORNEY

March 31, 1964 A. A. MUELLER 3,127,501
PRECISION ELECTRIC WELDING HEAD
Filed April 27, 1962 4 Sheets-Sheet 2
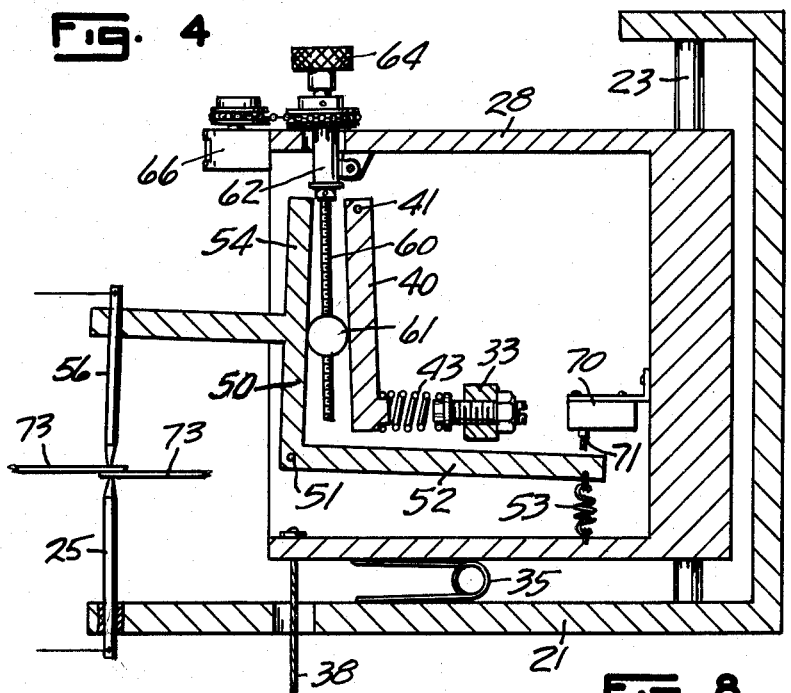
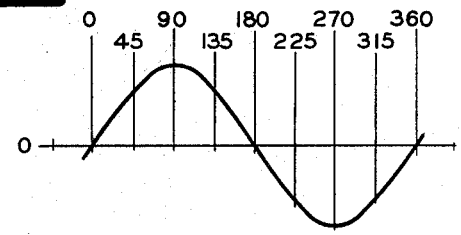
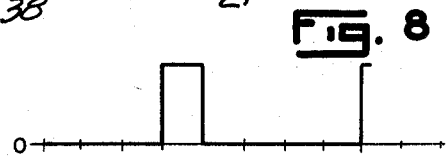
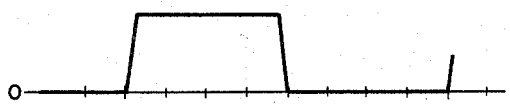
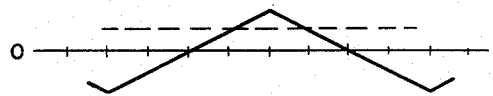
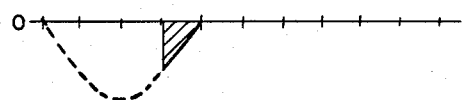
INVENTOR.
ANDREW A. MUELLER
BY
Eugene C. Knoblock
ATTORNEY

INVENTOR.
ANDREW A. MUELLER

United States Patent Office 3,127,501
Patented Mar. 31, 1964

3,127,501
PRECISION ELECTRIC WELDING HEAD
Andrew August Mueller, Clay Township, St. Joseph County, Ind., assignor to Wells Electronics, Inc., South Bend, Ind., a corporation of Indiana
Filed Apr. 27, 1962, Ser. No. 190,622
15 Claims. (Cl. 219—86)

This invention relates to a precision electric welding head, and more particularly to a miniature unit particularly suited for use in welding fine wires and other components of small electrical units and small mechanisms or instruments. The apparatus is of the stored energy resistance welding type.

The primary object of this invention is to provide a device of this character which is adjustable over a wide range with respect to welding pressure applied thereby, that is, the force exerted between the electrodes at the instant the weld energy is released and the weld is accomplished.

A further object is to provide a device of this character which can be adjusted to exert desired welding pressure and can be reset with accuracy and in which repeated operations entail weld pressures of substantially identical values, and particularly a device in which errors in resetability of the unit and errors of repeatability of weld pressure are each less than five percent of desired pressure.

A further object is to provide a device of this character whose welding pressure can be calibrated at the factory and whose setting can be determined with high accuracy through a counter or other indicator associated with the adjusting means thereof.

A further object is to provide a device of this character wherein frictional effects of the operation of the parts, and particularly coupled friction entailing forces due to motion which appear as a part of the welding pressure, are reduced to a negligible quantity.

A further object is to provide a device of this character wherein the paths of force application, the application of spring pressure, and the arrangement and location of the trip mechanism provide performance characteristics involving ease and accuracy of operation superior to prior devices.

A further object is to provide a device of this character having a novel combination and arrangement of parts for setting and controlling the welding pressure exerted upon operation of the device.

Other objects will be apparent from the following specification.

In the drawings:

FIG. 4 is a vertical sectional view taken on plane 3—3 of FIG. 2, and illustrating the parts in operating position;

FIG. 5 is a graph illustrating applied line voltage;

FIG. 6 is a graph illustrating the voltage in an operating circuit at one point thereof;

FIG. 7 is a graph illustrating the voltage in an operating circuit at another point thereof;

FIG. 8 is a graph illustrating the voltage in the operating circuit at still another point thereof;

FIG. 9 is a graph illustrating the primary voltage in the operating circuit at one point thereof;

FIG. 10 is a graph illustrating the secondary voltage in the operating circuit at another point thereof;

Figure 1:
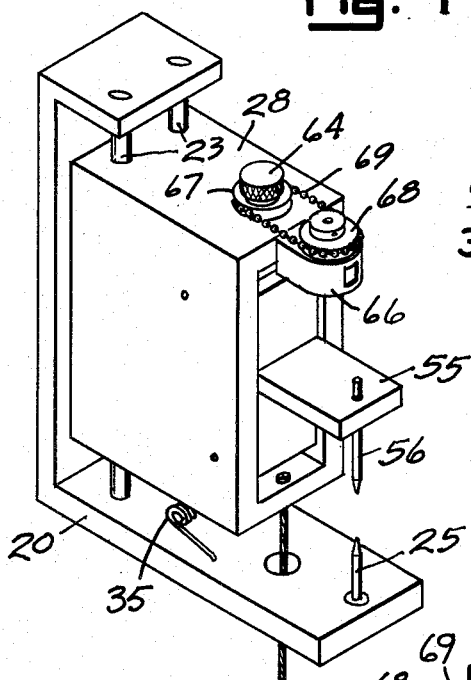
FIG. 1 is a perspective view of one embodiment of the invention, with parts illustrated schematically.
Figure 2:
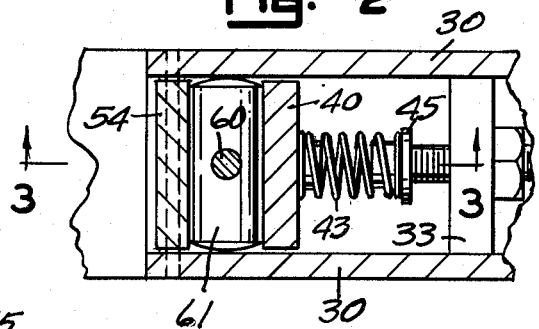
FIG. 2 is an enlarged fragmentary horizontal sectional detail view taken on line 2—2 of FIG. 3.

Referring to the drawings, and particularly to FIGS. 1 to 4 which illustrate one embodiment of the invention, the numeral 20 designates a primary or stationary frame which is provided with a base plate 21. The frame and the base plate cooperate to mount fixedly any suitable guide means, such as a pair of vertical guide shafts 23, arranged in parallel relation and anchored at their lower ends in apertures in the base plate 21 and at their upper ends in an upper frame portion 24. The frame 20 may mount a fixed electrode 25, as at the front of the base plate 21 thereof, said electrode being suitably insulated at 26 and having an electrical connection with a power supply lead shown schematically at 27.

A secondary or movable frame unit 28 is mounted for guided movement upon the frame 20 and may include a top plate portion 29, side plates 30, a rear upright wall 31 and a bottom wall 32. A cross bar 33 connects the side walls 30, for purposes to be described. The upright wall 31 preferably has passages therethrough fitting upon the guide means and preferably mounting bearing means 34 serving to provide free and accurate movement of the movable frame 28 upon the stationary frame 20. Any suitable spring 35 interposed between the base plate 21 and the bottom 32 of the movable frame serves normally to position the movable frame 28 in spaced relation above the base at a rest position. Operating or actuating means are provided to lower the movable frame 28 upon the fixed frame 20 against the action of the spring 35. As here shown, a foot pedal 36 may be employed positioned spaced below the device, as upon the floor when the device is mounted upon a bench. The base plate 21 may have an opening 37 therein, through which may pass a cable 38 extending between the foot pedal 36 and the bottom plate 32 of the movable frame 28.

A reference lever 40 is pivotally mounted in the movable frame 28 at one end thereof, as at 41, adjacent the upper end of the movable frame 28. The free end of the lever 40, here shown as the lower end thereof, is preferably provided with a boss 42 encircled by one end portion of a coil spring 43. The opposite end of the coil spring 43 encircles the end of an adjustment screw 44 which is screw-threaded in an aperture in the cross bar 33, and which has an abutment 45 against which the end of the spring 43 bears. A lock nut 46 may be employed to maintain the setting of the screw 44 so as to calibrate and adjust the pressure of the spring 43 which is exerted against the lever 40.

Figure 3:
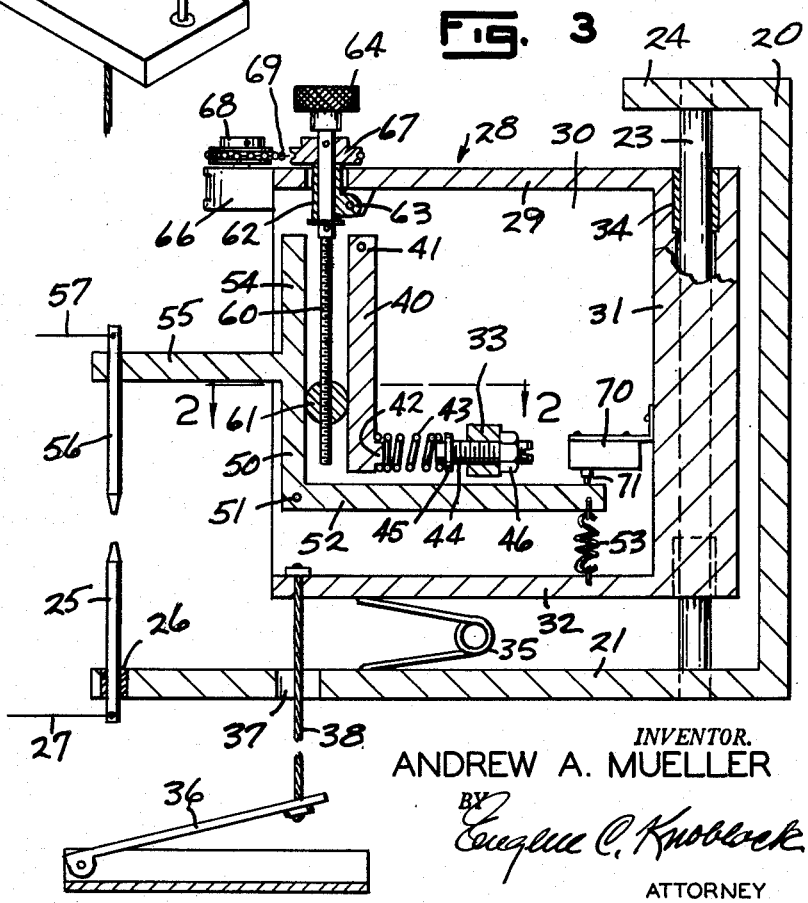
FIG. 3 is a vertical sectional view taken on line 3—3 of FIG. 2, and illustrating the mechanism in its inoperative or rest position.

Another lever 50 is pivoted to the movable frame 28 at 51 in laterally and vertically spaced relation to the pivot 41 of the spring lever 40. The lever 50 is preferably substantially L-shaped and includes a substantially horizontal lower leg 52 extending with clearance below the lower end of the spring lever 40 and the cross bar 33 and being connected to the bottom plate of the movable frame 28 by a tension spring 53 serving to swing the lever 50 in clockwise direction, as illustrated in FIGS. 3 and 4. An upright portion 54 of the lever 50 extends in spaced confronting relation to the spring layer 40 and an electrode mounting arm 55 projects outwardly therefrom to mount the movable electrode 56 having a suitable connection 57 with the operating circuit.

Means for adjusting the welding pressure, that is, the force exerted between the electrodes at the instant the weld energy is released, is interposed between the levers 40 and 54. In the embodiment illustrated in FIGS. 3 and 4, this means includes a lead screw or adjusting screw 60 mounting a member 61 positioned between the levers 40 and 54 and preferably in contact therewith. In this construction the lead screw 60 is journaled in a bearing or carrier 62 which is pivoted at 63 to the top member 29 of the movable frame 28 and extends through an opening in said top member. The screw 60 carries an adjusting knob 64 by means of which screw 60 may be rotated for the purpose of adjusting the vertical position of the member 61 between the two levers 40 and 54.

A counting mechanism 66 is carried by the movable frame 28 and has a drive connection with the shaft of the screw 60, so that it may serve to count the number of revolutions or fractional revolutions of the shaft 60 relative to a starting position. For this purpose, a pulley 67 may be mounted upon a screw shaft 60 and a pulley 68 may be mounted upon the counter 66 and a bead chain or other drive transmitting means 69 passes around the pulleys. The counting mechanism 66 preferably is so adjusted that in a screw having 100 threads, the counter will operate in digital steps, each representing one-tenth of a revolution of the screw 60. The counter will preferably carry indicia to indicate its setting, and this indicia makes possible any predesired setting and any resetting to a particular position. By this mechanism a resetability with a tolerance or error of less than five percent is provided.

The mechanism is controlled by a switch 70 which is preferably of the low differential or snap action type having a feeler or actuator 71 normally contacted by the lever arm 52 to maintain the switch in open circuit position. Any clockwise movement of the lever 52, as viewed in FIG. 3 and FIG. 4, causes operation of the switch 70 by disengagement of the lever arm 52 from the feeler 71, so as to initiate the operating circuit.

Figure 11:
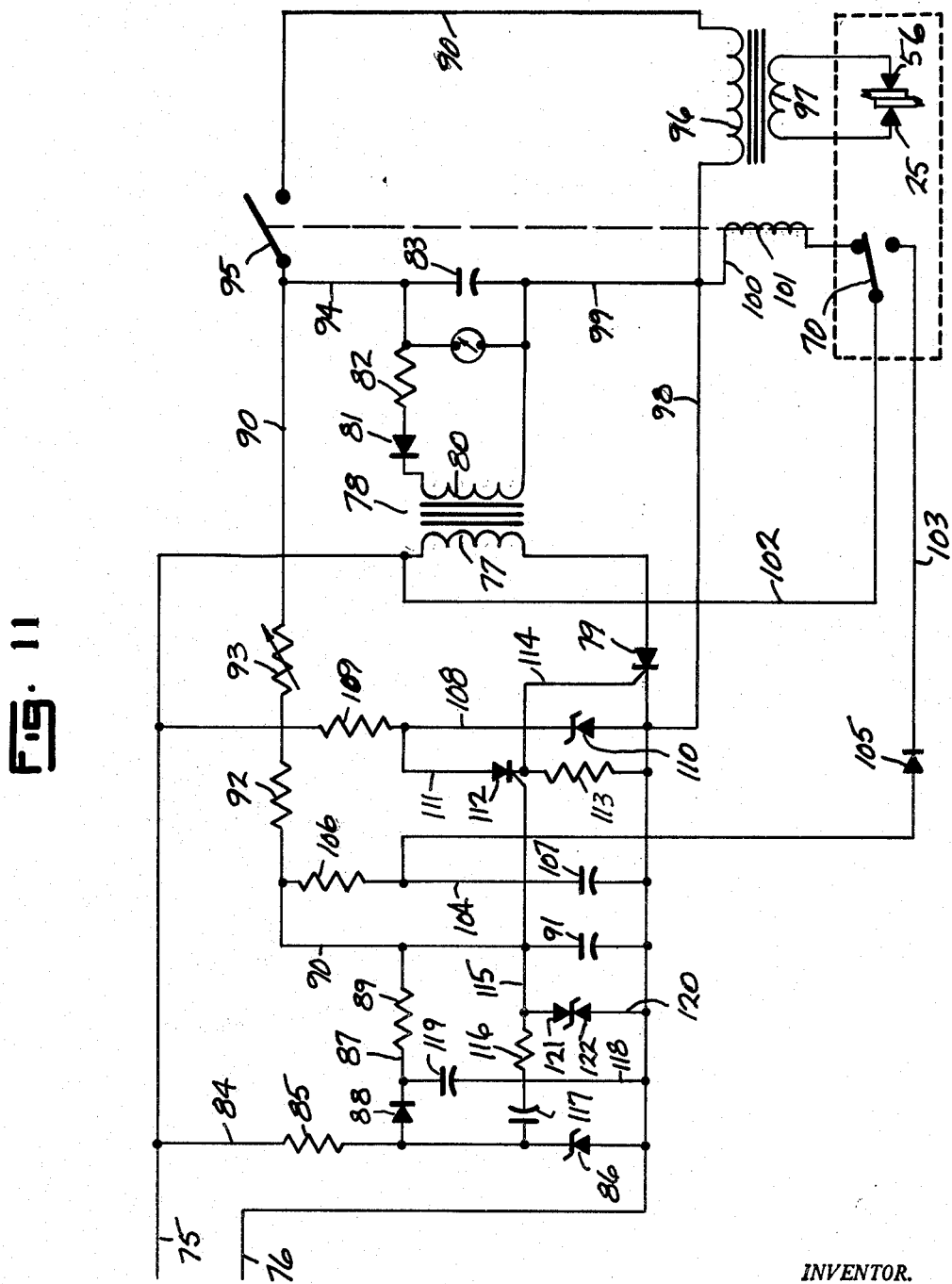
FIG. 11 is a wiring diagram of a circuit usable with the device.

Any suitable storage energy circuit may be utilized in the operation of the device, and one such circuit particularly well suited for the device is illustrated in FIG. 11. This circuit is characterized by close regulation of the stored energy level. Regulation is accomplished by application of output sampling principles in the control circuitry and essentially the output voltage is compared to a a stabilized reference voltage by means of summing resistors so the control adjusts the energy flow to the capacitors to result in the sum of the reference voltage and the output voltage being equal to the conduction trigger voltage of the control. By changing the ratio of the summing resistors, the energy level is adjusted to the desired value. In the control circuits, the conduction angle is automatically decreased when the energy level exceeds the desired value and conversely the conduction angle is automatically increased when the energy level is less than the desired value. The circuit preferably uses semi-conductor devices.

In this circuit line voltage is applied to leads 75 and 76 to which is connected the primary 77 of a transformer 78. The lead 76 has a controlled rectifier member 79 interposed therein. The secondary 80 of the transformer 78 is connected in a circuit having rectifier 81, resistor 82 and one or more storage capacitors 83 interposed therein.

A lead 84 connects lines 75 and 76 and has interposed therein a resistor 85 and a zener rectifier 86. A lead 87 branches from lead 84 between the resistor 85 and the rectifier 86 and has interposed therein a rectifier 88 and a resistor 89. Lead 87 is connected to a lead 90 having a capacitor 91 interposed in a portion thereof between lead 87 and line 76. Lead 90 in another portion thereof has interposed therein a resistor 92 and a variable resistor 93 and is connected by a line 94 with the secondary transformer circuit containing the storage capacitors 83. The lead 90 also has interposed therein the switch 95 of a relay and the primary 96 of a welding transformer whose secondary 97 is connected to the welding electrodes 25 and 56. Lead 98 extends from the welding transformer primary 96 to the line 76 and has connection by lead 99 with the storage capacitor circuits. The lead 100 has interposed therein the coil 101 of the relay which controls the relay switch 95 and this lead in turn is connected to one terminal of the operating switch 70 connected by lead 102 to the line 75. The other terminal of the switch 70 is connected by lead 103 to a lead 104 which interconnects line 76 and lead 90. Lead 103 has rectifier 105 therein. Lead 103 is connected to lead 104 between a resistor 106 and a capacitor 107 interposed in the lead 104. A lead 108 extends between the lines 75 and 76 and is preferably connected to lead 98 and has interposed therein a resistor 109 and a limiting zener regulator 110. A lead 111 branches from lead 108 between the resistor 109 and a zener regulator 110 and has interposed therein a control rectifier 112 and a resistor 113. A lead 114 connects the rectifier 79 and the lead 111 between the rectifier 112 and resistor 113. A lead 115 extends from the control rectifier 112 to the lead 84 and has connection with lead 90. Lead 115 has interposed therein a resistor 116 and a capacitor 117. A lead 118 connects line 76 and lead 87 and has a capacitor 119 interposed therein. A lead 120 connects line 76 and lead 115 and has interposed therein zener regulators or limiters 121 and 122.

The operation of the device entails the positioning of the work pieces 73 to be welded in proper position upon the tip of the lower stationary electrode 25 and the energization of the device by the means for moving or lowering the movable frame 28 against the action of the spring 35. In this instance, this action is produced by tripping the pedal 36 to pull downwardly upon the cable 38 and lower the slidable frame unit 28 upon the guide means 23. When the upper electrode 56 makes contact with the work pieces 73, to clamp them against the lower electrode 25, the tip of electrode 56 is prevented from further downward movement with the slidable frame 28 and continued downward pressure application on the slidable frame unit 28 results in pivoting of the levers 40 and 50 against the action of the spring 43, as illustrated in FIG. 4. As the lever 50 pivots, its arm 52 disengages the switch 70 to trip the switch and energize the welding circuit.

The amount of welding pressure applied is a function of the position of the member 61 and particularly of its spacing relative to the pivot axes 41 and 51. The welding pressure applied between the movable and fixed electrode is $$WP \text{ (lbs.)} = \frac{Fsd^1d^3}{d^2d^4}$$

where:

$Fs$ = Preset force applied by the reference spring 43, in pounds,
$d_1$ = The moment arm length between the axis of pivot 41 of lever 40, and the center of application of pressure of spring 43 to lever 40
$d_2$ is the moment arm length of lever 40 between the axis of pivot 41 and the point of contact of member 61 with lever 40,
$d_3$ is the moment arm length of lever 50 between the center or axis of pivot 51 and the point of contact of member 61 with the lever 50, and
$d_4$ is the moment arm length between the center of pressure of the movable electrode 56 at its tip and the axis of the pivot 51.

Since $d_1$ and $d_4$ are constant and can be made equal, it will be apparent that the welding pressure becomes a function of the strength of the spring 43 and the position of the member 61 relative to the two pivot axes 41 and 51. This makes possible a wide range of welding pressures, such as a range of 80 to 1. In one embodiment of the invention, where adjustment of the position of member 61 is variable so that $d_2$ varies from .2 inch to 1.8 inches, and $d_3$ varies from 1.8 inches to .2 inch, a welding pressure of twenty pounds can be secured with a preset force on spring 43 of 2.2 pounds by a setting of member 61 wherein $d_3$ is 1.8 inches and $d_2$ is .2 inch. By a reverse setting where member 61 is adjusted close to pivot 51 so that $d_3$ is .2 inch and $d_2$ is 1.8 inches, the effective welding pressure can be reduced to .245 pound.

An important characteristic of the device is the ability to reset the system within a range of close tolerance. This can be done by adjusting the mechanism to a position determined by the counter 66. Thus to maintain resetability of the system within five percent, a position of accuracy slightly less than .01 is required of the member 61. In cases where the counter indicates from zero to 999 in digital steps of one-tenth revolution of the screw 60, it will be apparent that 99.9 revolutions of the screw 60 are required to encompass the counter range. This provides a fine degree of adjustment made possible with accuracy and assurance by reading of the indicia of the counter.

Other considerations of the device include the fact that the effect of spring rate is compensated for by the action of the mechanism and is maintained within limits to insure maintenance with accuracy of the repetition of weld pressure at the instant of weld in a series of successive welds. In considering welding pressure, it is to be noted that coupled friction, namely, those forces due to motion which appear as a part of the welding pressure introduced through the bearing pivots 41 and 51 of the levers 40 and 50, respectively, is negligible in the mechanism. The bearing pivot may have a small moment arm compared to the reference spring moment arm $d_1$ and the movable electrode moment arm $d_4$ in conjunction with the pressure exerted by the reference spring 43 so that the welding pressure results in negligible coupled friction in the mechanism when using sleeve type bearings for the pivots.

A careful choice of the position of the switch 70 with respect to the position of the pivot axis 51 and the use of a low differential switch, such as a snap action switch of micro switch, will readily maintain the resolution of the system so as to have a negligible effect on repeatability. The normal restoring force exerted by the switch 70 and the balance spring 53 is used to balance the overhanging mass of the movable electrode 52 so as to compensate for this effect upon the weld pressure.

Figure 12:
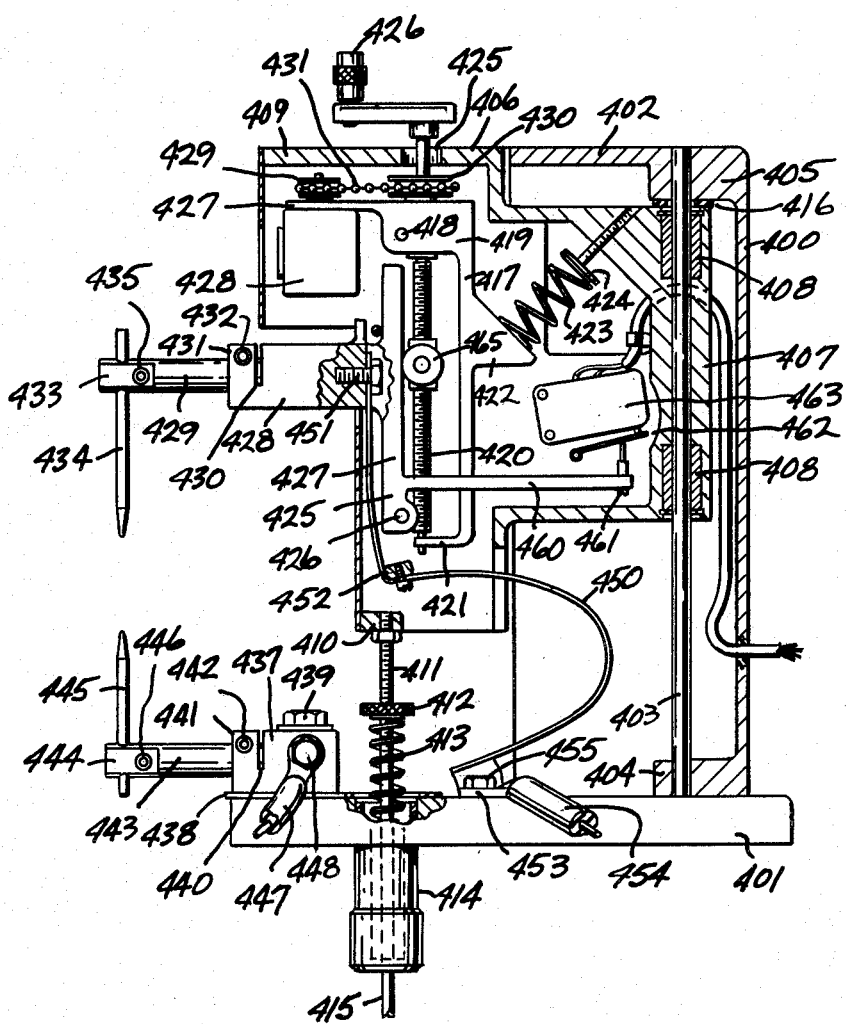
FIG. 12 is a side view of another embodiment of the invention with parts broken away.

Another embodiment of the invention is illustrated in FIG. 12. In this construction, a stationary frame 400, which may constitute a casting, is provided with a base plate 401, upright walls and a top wall 402. One or more guide rods 403 are mounted in suitable bosses 404 and 405 to extend vertically in parallel relation. A movable body part or casting 406 may include an upright apertured part 407 carrying bearings 408 and fitting upon the uprights 403 for guided movement. The movable casting preferably includes a top wall 409, side walls and a lower part 410 to which is secured a screw-threaded member 411. Member 411 has screw-threaded thereon a nut 412 forming an abutment for a coil spring 413 which projects into a cup-shaped member 414 mounted in an opening in the base 401. The stem 411 may have connection with a cable 415 passing through the part 414. It will be understood that the spring 413 serves to urge the movable casing or frame 406 upwardly with a pressure depending upon the setting of the nut 412, so that the upper part of the movable frame 406 normally abuts a bumper 416.

A reference spring lever 417 is pivoted to the movable frame 406 at 418. The lever 417 includes a head 419 having a bore which journals a screw-threaded shaft 420 adjacent one end thereof. The lower end portion 421 of the lever 417 has an aperture journaling the lower end of the screw 420. The lever 417 also has an abutment member 422 intermediate its length against which abuts a reference coil spring 423. The setting of the coil spring 423 is determined by an abutment member 424 screw-threaded in the frame 406.

The top 409 of the movable frame 406 has an aperture 425 therein through which passes freely the upper end of the screw shaft 420 so as to mount an adjusting crank 426 above the movable frame 406. The upper end of the lever 417 preferably has a lateral extension 427 which serves to mount a counting device 428 having an indicator. A drive connection between the counting device 428 and the screw 420 is provided, which may constitute a pulley or socket 429 on the counter, a pulley or sprocket 430 on the screwshaft 420, and a bead chain 431 of like motion transmission mechanism trained around the two members 429 and 430.

An electrode mounting lever 425 is pivoted at 426 to the movable frame 406 spaced below the pivot 418 of the reference spring lever 417. The lever 425 includes an elongated vertical or upright portion 427 having a surface extending substantially parallel to reference spring lever 417 in the normal position of the parts. A boss 428 projects laterally outwardly from lever portion 427 and at its outer end is provided with a central axial bore in which is rotatably mounted an electrode carrier 429. The outer end of the boss 428 is preferably split axially and separated by a slot 430 from the balance thereof to define a pair of jaws 431 drawn together by a cap screw 432 for the purpose of clamping the electrode holder 429 in selected longitudinal and rotative adjustment. The outer end of the electrode holder 429 is preferably split to provide jaws 433 at its end, between which is clamped a movable electrode 434 held in place by a draw screw 435 connecting the jaws.

The base 401 mounts a block 437 insulated therefrom by suitable electrical insulating means including a plate 438 and held in selected adjusted position by securing means including a bolt 439. The block 437 defines a chuck for which purpose it is preferably slotted at 440 to define an end portion split lengthwise so as to provide a pair of jaws 441 drawn together by a screw 442 and clamping between them in selected rotative and longitudinal adjustment an elongated electrode holder 443. The electrode holder 443 has a pair of jaws 444 formed at its outer end, between which is clamped a fixed electrode 445 by means of screw 446.

An electric lead or cable 447 is anchored and electrically connected to the block 437 by a bolt 448. An elongated flexible conductor strap 450 is electrically connected to the electrode mounting boss 428 by means of a screw 451. This strap is preferably secured to a cross bar 452 carried by the movable frame 406 and is bowed between said part 452 and a terminal portion 453 anchored to the base 401 in electrical connection with a second cable 454 by means of a bolt 455.

The electrode mounting lever 425 has an elongated substantially horizontally extending arm 460 projecting rearwardly therefrom with clearance with respect to the reference spring lever 417. At its free end the lever arm 460 mounts a trip switch adjustment screw 461 projecting therefrom adjustably into contact with a switch tripping lever 462 pivoted to the frame 406 and adapted to trip the plunger of a quick action snap switch or micro switch 463 carried by the frame 406.

This construction of the device has the same function as explained previously and differs from the embodiment previously described principally with respect to the lever adjustment means which, in this case entail the screw-threaded mounting of the adjustable lever setting member 465 upon member 420. Member 465 preferably includes one or more rollers contacting a surface of the part 427 of the electrode mounting lever and clear of the reference spring lever 417. The adjustment of the member 465 with relation to the spacing of its contact with the lever part 427 from the respective pivot axes 418 and 426 determines the amount of spring pressure applied, in the same fashion described in connection with the previous embodiment.

Other features of this embodiment of the device are the mounting of the lever adjusting means, the counter and the screw-adjusting crank completely upon the reference spring lever 417 which facilitates manufacture by preassembly of sub-combinations or sub-assemblies. Another characteristic of this construction is the provision of the nut 412 serving to confine the spring 413 and also serving as a stop engaging base 401 to prevent application of excessive weld pressure by continued application of pressure by a foot pedal after a weld is completed. Still another advantage is the absence of any effect of change of setting of member 465 upon the position of the movable electrode. The use of the spring clip adjustment screw 461 also constitutes an improvement with respect to control of the tripping of the switch 463 incident to the application of pressure to the work by the electrodes 434 and 435.

Another important characteristic of this construction is the mounting of the respective electrodes in such a manner that register of the tips of the electrodes can be effected easily. Thus each of the electrode holders 429 and 443 can be adjusted lengthwise thereof and rotatively. This permits the two electrodes to be adjusted to angularly extending converging positions to enable a weld to be effected within a housing or other recess and thus eliminates the requirement that parts to be welded must be exposed and open as is true in cases where electrodes can only be positioned in alignment with each other.

The operating characteristics of the circuit are illustrated schematically in FIGS. 5 to 10 wherein time phase is indicated in degrees on the horizontal base line in each figure. FIG. 5 designates the wave form of one cycle of the applied A.C. current. The control circuit operation depends upon automatic variation of the time phase relationship between the applied line voltage and the conduction point of the control rectifier. As the conduction angle is varied the total amount of energy transferred to the storage capacitors is affected and the maximum D.C. voltage to which the capacitors can charge is also affected.

FIG. 6 illustrates the wave form established in lead 84 between resistance 85 and rectifier 86, with the voltage level being determined by said rectifier. This voltage is stable and does not change in value with variations of the applied line voltage.

FIG. 7 illustrates the wave form established in lead 115 between resistance 116 and rectifier 112. The dotted line represents the trigger voltage of the gate of the control rectifier 112. This trigger level is a stable characteristic of the device and normally is not subject to change with time. The absolute or D.C. level of this wave form is a result of the vector addition of the reference positive voltage in lead 87 between rectifier 88 and resistor 89 and the power supply capacitor voltage at lead 90 between variable resistance 93 and relay switch 95 or transformer primary 96. The triangular shape or A.C. component of the wave form of FIG. 7 is obtained by the action of capacitors 117 and 91 and resistance 116 and functions to prevent triggering of the control rectifiers 112 and 79 during the 0° to 90° interval. Since this A.C. component is derived from the square wave, FIG. 6, it is stabilized against changes in the applied line voltage.

FIG. 8 is the wave form of the voltage at the base of control rectifier 112, i.e. in lead 114 between the rectifiers 112 and 79. The time phase dimension of the wave shown is the conduction angle.

FIG. 9 is the wave form of the voltage across the primary 77 of the transformer 78. FIG. 10 is the wave form of the voltage across the secondary 80 of the transformer 78. The time phase dimension of the wave form in each of FIGS. 9 and 10 is the conduction angle.

These wave form illustrations characterize the electrical operation of the device and evidence an efficient, regulated, stored energy power supply for a resistance welding device utilizing solid state components.

While the preferred embodiments of the invention have been illustrated and described, it will be understood that changes in the construction may be made within the scope of the appended claims without departing from the spirit of the invention.

I claim:
1. An electric welding device comprising
a primary frame,
a second frame shiftable on said primary frame between operative and inoperative positions,
spring means urging said second frame to inoperative position,
actuating means for moving said second frame toward operative position,
a reference spring carried by said second frame,
a reference spring lever pivoted to said second frame and engaged by said reference spring,
an electrode lever pivoted to said second frame spaced from the pivot axis of said reference spring lever,
an electrode carried by said electrode lever,
an electrode carried by said primary frame, and
adjustable means for varying the effective spring pressure of said reference spring acting on said lever when said second frame is moved to position said electrodes in clamping engagement with work to be welded.

2. An electric welding device comprising
a primary frame,
a movable frame shiftable on said primary frame between operative and inoperative positions,
spring means urging said movable frame to inoperative position,
actuating means for moving said movable frame toward operative position,
a reference spring carried by said movable frame,
a reference spring lever pivoted to said movable frame and engaged by said reference spring,
an electrode lever pivoted to said movable frame spaced from the pivot axis of said reference spring lever,
an electrode carried by said electrode lever,
an electrode carried by said primary frame,
adjustable means for varying the effective spring pressure of said reference spring acting on said lever when said movable frame is moved to position said electrodes in clamping engagement with work to be welded, and
a control switch actuated by said electrode lever.

3. An electric welding device comprising
a primary frame,
a movable frame shiftable on said primary frame between operative and inoperative positions,
a spring means urging said movable frame to inoperative position,
actuating means for moving said movable frame toward operative position,
a reference spring carried by said movable frame,
a reference spring lever pivoted to said movable frame and engaged by said reference spring,
an electrode lever pivoted to said movable frame spaced from the pivot axis of said reference spring lever,
an electrode carried by said electrode lever,
an electrode carried by said primary frame,
adjustable means for varying the effective spring pressure of said reference spring acting on said lever, when said movable frame is moved to position said electrodes in clamping engagement with work to be welded, and
means for indicating the adjustment of said last named means.

4. An electric welding device comprising
a primary frame,
a movable frame shiftable on said primary frame between operative and inoperative positions,
spring means urging said movable frame to inoperative position,
actuating means for moving said movable frame toward operative position,
a reference spring carried by said movable frame,
a reference spring lever pivoted to said movable frame and engaged by said reference spring, an electrode lever pivoted to said movable frame spaced from the pivot axis of said reference spring lever,
an electrode carried by said electrode lever,
an electrode carried by said primary frame, and
motion transmitting means interposed between said levers and adjustable along said electrode lever to selected spacing relative to the pivot axes of said levers.

5. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame, and
yieldable means normally positioning said movable electrode unit and resisting pivoting of said lever.

6. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame,
yieldable means normally positioning said movable electrode unit and resisting pivoting of said lever, and
a control switch actuated by said lever.

7. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame, and
yieldable means normally positioning said movable electrode unit and resisting pivoting of said lever,
said stationary frame having a guide traversed by said movable frame in moving between inoperative and operative positions.

8. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame, and
yieldable means normally positioning said movable electrode unit and resisting pivoting of said lever,
said yieldable means including an adjustable part for varying the resistance to pivoting of said lever.

9. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame,
yieldable means normally positioning said movable electrode unit and resisting pivoting of sad lever,
scre-threaded means for adjusting the resistance to pivoting of said lever exerted by said yielding means, and
a counter actuated by said screw-threaded means and having an indicator.

10. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said frame, and
yieldable means normally positioning said movable electrode unit and resisting pivoting of said lever,
said yieldable means including a part adjustable along the length of said lever for applying to said lever the resistance of said yielding means to pivoting of said lever.

11. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame, and
yieldable means normally positioning said movable electrode unit and resisting pivoting of said lever,
said yieldable means including a spring urged lever pivoted to said movable frame spaced from the pivot of said electrode lever, and
means adjustable lengthwise of said levers and between the pivot axes of said levers for transmitting motion from one lever to the other.

12. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame, and
yieldable means normally positioning said movable electrode unit and resisting pivoting of said lever,
said yieldable means including
    a spring urged lever pivoted to said movable frame, spaced from the pivot of said electrode lever,
    elongated portions of said levers normally extending in spaced juxtaposed relation, and
    means for transmitting motion from one lever to the other and including
    an elongated screw-threaded shaft between said juxtaposed elongated lever portions,
    an abutment member screw-threaded on said shaft, and engaging said juxtaposed lever portions, and
    means for rotating said shaft.

13. An electric welding device comprising
a primary frame,
an electrode mounted on said frame, a movable frame shiftable on said primary frame between inoperative and operative positions,
spring means urging said movable frame to inoperative position,
actuating means for advancing said movable frame to operative position,
a movable electrode unit including a lever pivoted to said movable frame, and
yieldable means normally positioning said movable electrode unit and resisting pivoting of said lever,
said yieldable means including
    a spring urged lever pivoted to said movable frame spaced from the pivot of said electrode lever,
    elongated portions of said levers normally extending in spaced juxtaposed relation, and
    means for transmitting motion from one lever to the other and including
        an elongated screw-threaded shaft journaled on one lever and positioned between said juxtaposed elongated lever portions and
        an abutment member screw-threaded on said shaft and engaging the other lever at said elongated lever portion.

14. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame, and
yieldable means normally positioning said movable electrode unit and resisting pivoting of said lever,
at least one electrode being mounted in a carrier accommodating adjustment of horizontal spacing thereof from its mounting frame and tilting thereof to selected angular relation to the vertical.

15. An electric welding device comprising
a primary frame,
an electrode mounted on said frame,
a movable frame shiftable on said primary frame between inoperative and operative positions,
spring means urging said movable frame to inoperative position,
actuating means for advancing said movable frame to operative position,
a movable electrode unit including a lever pivoted to said movable frame, and
yieldable means normally positioning said movable electrode unit and resisting pivoting of said lever,
each of said electrodes being secured adjustably by a carrier in selected spaced relation to its mounting frame and in selected angular relation to each other.

References Cited in the file of this patent
UNITED STATES PATENTS

| | | |
|---|---|---|
| 1,988,537 | Breguet | Jan. 22, 1935 |
| 2,253,702 | Hall | Aug. 26, 1941 |